(12) United States Patent
Olechowski, III et al.

(10) Patent No.: US 12,505,653 B2
(45) Date of Patent: Dec. 23, 2025

(54) AUTO-REVIEW SYSTEM

(71) Applicant: Blinkfire Analytics, Inc., Chicago, IL (US)

(72) Inventors: Stephen Joseph Olechowski, III, Glen Ellyn, IL (US); Nan Jiang, Lincolnshire, IL (US); Ashwin Krishnaswami, Chicago, IL (US); Matteo Kenji Miazzo, Chicago, IL (US); Scott Frederick Majkowski, Chicago, IL (US)

(73) Assignee: Blinkfire Analytics, Inc., Chicago, IL (US)

( * ) Notice: Subject to any disclaimer, the term of this patent is extended or adjusted under 35 U.S.C. 154(b) by 376 days.

(21) Appl. No.: 18/070,375

(22) Filed: Nov. 28, 2022

(65) Prior Publication Data

US 2023/0169758 A1     Jun. 1, 2023

Related U.S. Application Data

(60) Provisional application No. 63/285,009, filed on Dec. 1, 2021.

(51) Int. Cl.
*G06V 10/774*     (2022.01)
*G06V 30/146*     (2022.01)

(52) U.S. Cl.
CPC .......... *G06V 10/774* (2022.01); *G06V 30/147* (2022.01); *G06V 2201/09* (2022.01)

(58) Field of Classification Search
CPC . G06V 10/774; G06V 30/147; G06V 2201/09
See application file for complete search history.

(56) References Cited

U.S. PATENT DOCUMENTS

| | | |
|---|---|---|
| 8,145,526 B2 | 3/2012 | Redlich |
| 9,177,333 B2 | 11/2015 | Sinyagin et al. |
| 9,870,571 B1 | 1/2018 | LaMontagne et al. |
| 9,875,234 B2 | 1/2018 | Myslinski |
| 9,996,853 B2 | 6/2018 | Myers et al. |
| 10,057,644 B1 * | 8/2018 | Farre Guiu ...... H04N 21/44008 |
| 10,192,131 B2 | 1/2019 | Olechowski et al. |
| 10,438,224 B1 | 10/2019 | Layne et al. |
| 10,467,526 B1 * | 11/2019 | Appalaraju .......... G06V 10/774 |
| 10,699,167 B1 | 6/2020 | Dowdall et al. |
| 10,762,374 B2 | 9/2020 | Olechowski, III et al. |
| 11,151,598 B2 | 10/2021 | Olechowski, III et al. |

(Continued)

FOREIGN PATENT DOCUMENTS

KR     102111491     5/2020

*Primary Examiner* — Pinalben Patel
(74) *Attorney, Agent, or Firm* — Carr & Ferrell LLP

(57) ABSTRACT

A cascade auto-review system for automated classification and annotation of input is provided. An example system is structure adaptive and task oriented and includes a communication module configured to receive the input including images, videos, and metadata. The system further includes a plurality of subsystems. Each subsystem has a series of successive classifier stages configured to detect tags in the input and approve or reject the tags based on the images, the videos, and the metadata. The system further includes a database to store results of the classification and annotation. The results are used to train computer vision and machine learning algorithms.

20 Claims, 23 Drawing Sheets

(56) References Cited

U.S. PATENT DOCUMENTS

| | | |
|---|---|---|
| 11,507,866 B1 | 11/2022 | Butler et al. |
| 11,741,364 B2 | 8/2023 | Tilton et al. |
| 12,080,046 B2 | 9/2024 | Saraee et al. |
| 2005/0018904 A1 | 1/2005 | Davis |
| 2007/0022329 A1 | 1/2007 | Adamek et al. |
| 2008/0144942 A1 | 6/2008 | Besley et al. |
| 2009/0123025 A1* | 5/2009 | Deng .................. G06V 20/635 725/60 |
| 2009/0177537 A1 | 7/2009 | Taylor et al. |
| 2009/0192929 A1 | 7/2009 | Hoeflinger et al. |
| 2009/0292595 A1 | 11/2009 | Tonnison et al. |
| 2009/0327057 A1 | 12/2009 | Redlich |
| 2010/0332404 A1 | 12/2010 | Valin |
| 2011/0145064 A1 | 6/2011 | Anderson et al. |
| 2011/0288907 A1 | 11/2011 | Harvey et al. |
| 2011/0313865 A1 | 12/2011 | Sinyagin et al. |
| 2012/0158461 A1 | 6/2012 | Aldrey et al. |
| 2012/0197712 A1 | 8/2012 | Martignoni et al. |
| 2012/0263385 A1 | 10/2012 | van Zwol et al. |
| 2012/0284105 A1 | 11/2012 | Li |
| 2013/0054484 A1 | 2/2013 | Hoeflinger et al. |
| 2013/0073388 A1 | 3/2013 | Heath |
| 2013/0085803 A1 | 4/2013 | Mauro et al. |
| 2013/0325550 A1 | 12/2013 | Varghese et al. |
| 2013/0346172 A1 | 12/2013 | Wu |
| 2014/0052527 A1 | 2/2014 | Roundtree |
| 2014/0052555 A1 | 2/2014 | MacIntosh |
| 2014/0219569 A1 | 8/2014 | Manson et al. |
| 2015/0023602 A1 | 1/2015 | Wnuk et al. |
| 2015/0317670 A1 | 11/2015 | Cavander et al. |
| 2015/0332317 A1 | 11/2015 | Cui et al. |
| 2016/0034712 A1 | 2/2016 | Patton et al. |
| 2016/0042253 A1 | 2/2016 | Sawhney et al. |
| 2016/0189200 A1 | 6/2016 | Olechowski et al. |
| 2016/0203225 A1 | 7/2016 | Alonso et al. |
| 2016/0239719 A1 | 8/2016 | Olechowski et al. |
| 2016/0292722 A1 | 10/2016 | Myers et al. |
| 2017/0140270 A1 | 5/2017 | Mnih et al. |
| 2018/0018698 A1 | 1/2018 | LaMontagne et al. |
| 2018/0082123 A1 | 3/2018 | Katz et al. |
| 2018/0082125 A1 | 3/2018 | Katz et al. |
| 2018/0082152 A1 | 3/2018 | Katz et al. |
| 2018/0084290 A1 | 3/2018 | Katz et al. |
| 2018/0084309 A1 | 3/2018 | Katz et al. |
| 2018/0084310 A1 | 3/2018 | Katz et al. |
| 2018/0349726 A1 | 12/2018 | Olechowski et al. |
| 2019/0098345 A1 | 3/2019 | Rahman |
| 2019/0311268 A1 | 10/2019 | Tilton et al. |
| 2020/0075148 A1 | 3/2020 | Nguyen et al. |
| 2020/0234088 A1 | 7/2020 | Taha et al. |
| 2020/0320769 A1 | 10/2020 | Chen et al. |
| 2020/0366959 A1 | 11/2020 | Pau et al. |
| 2021/0035180 A1 | 2/2021 | Chakraborty et al. |
| 2021/0158036 A1 | 5/2021 | Huber |
| 2021/0248629 A1 | 8/2021 | Sullivan et al. |
| 2022/0101371 A1 | 3/2022 | Beerbower et al. |
| 2023/0119208 A1 | 4/2023 | Jiang et al. |
| 2023/0206631 A1 | 6/2023 | Olechowski, III et al. |
| 2023/0334092 A1 | 10/2023 | Katz et al. |
| 2024/0070725 A1* | 2/2024 | Aher .................... G06V 10/774 |
| 2024/0193913 A1 | 6/2024 | Saraee et al. |
| 2024/0242287 A1 | 7/2024 | Rice |

* cited by examiner

| Spotter method | Precision |
|---|---|
| CMM | 99.6 % |
| VMS | 100 % |
| YLM | 98 % |

AUTO-REVIEW SYSTEM

CROSS-REFERENCE TO RELATED APPLICATIONS

The present application claims the priority benefit of U.S. Provisional Patent Application Ser. No. 63/285,009, filed on Dec. 1, 2021, titled "Auto-Review System." This application is related to U.S. patent application Ser. No. 17/967,784, filed on Oct. 17, 2022, titled "Sponsorship Exposure Metric System," which claims the benefit and priority of U.S. Provisional Patent Application Ser. No. 63/257,917, filed on Oct. 20, 2021, titled "Sponsorship Exposure Metric System." This application is further related to U.S. patent application Ser. No. 18/083,346 filed on Dec. 16, 2022, titled "Real-Time Media Valuation System and Methods", which claims the benefit and priority of U.S. Provisional Patent Application Ser. No. 63/293,602, filed on Dec. 23, 2021, titled "Real-Time Media Valuation System." The aforementioned applications are hereby incorporated by reference in their entirety.

TECHNICAL FIELD

The present disclosure relates generally to data processing and, more particularly, to systems for automated classification and annotation of input.

BACKGROUND

Gathering a large dataset of well-annotated data is critical to the accurate training of supervised machine learning algorithms. Collecting data for the training is typically burdensome because it requires manual tagging and annotations to ensure a robust training sample set.

The quality of the training sample set is directly related to the performance of supervised machine learning algorithms. A large and high-quality training sample set is more likely to obtain more accurate detection models, thus benefiting all related businesses down the stream.

Existing algorithms include threshold acceptance or manual acceptance. Using the threshold acceptance approach, if detection of computer vision (CV)/machine learning (ML) has a sufficiently high probability of being the detected label, it is accepted and considered as correct. Using the manual acceptance approach, manual reviewers/taggers need to review the data and decide whether the CV/ML detection is correct. The manual approach takes a long time and is prone to errors, especially if several different manual annotations have different baselines.

Existing algorithms in supervised machine learning require manual reviewers/taggers to have the dataset ready before a machine learning algorithm takes place for training purposes. With tens of thousands of review instances per day, 365 days a year, of all varieties, such methods of manual reviewing are cost prohibitive.

SUMMARY OF EXEMPLARY EMBODIMENTS

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an example embodiment, an auto-review system is provided. The system may include a communication module configured to receive the input. The input may include images, videos, and metadata. The system may also include a plurality of subsystems. Each subsystem may have a series of successive classifier stages configured to detect tags in the input and annotate the tags based on the images, the videos, and the metadata. The system may further include a database to store results of the classification and annotation, wherein the results are used to train computer vision and machine learning algorithms.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
FIG. 1 is a detection diagram showing a brand detection auto-review system for classification of the detection results, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides a cascade auto-review system for automated classification and annotation of input, as well as methods of assembling and implementing the same. The system may include a plurality of subsystems, each subsystem having classifier stages. In exemplary embodiments, the subsystems may include a brand detection auto-review system, an asset detection auto-review system, a scene detection auto-review system, and an active-passive detection auto-review system. Additional detection auto-review systems are envisioned, such as team crest and matched graphics, and as such this list of exemplary embodiments is not exhaustive. In these and further embodiments, additional layers of classifiers may be added to the system. The additional layers may be trained based on a task of any subsystem. The system is Structure Adaptive and Task Oriented (SATO).

In exemplary embodiments, the images may include source images and the videos may include source videos. In such embodiments, the system processes source images or source videos. Metadata in such embodiments may include one or more of the following: a brand ID, a publisher ID, a spotter ID, and a matched logo template. The list of metadata is dynamic and extends over time. In these and further embodiments, input for the system may be pulled from one or more social networks.

In some exemplary embodiments, when the series of successive classifier stages are unable to classify the input, the detection result is enqueued for human review. The series of successive classifier stages may be added to or removed from the series of successive classifier stages based on a task. The results of the classification and annotation may include one or more of the following: a brand ID and brand coordinates, an asset ID and asset coordinates, a scene ID, and an Active-Passive ID.

In practice, the SATO can be used to automatically review the sponsorship exposure results with minimal requirements on human interference. The system can also achieve high precision in annotation. In some embodiments, the results from the SATO system are used to train computer vision (CV)/machine learning (ML) algorithms used by the system.

The input of the SATO system may include a source image or a source video obtained from social networks and pulled into the system periodically, for example, daily. The input may also include additional metadata or metatags.

In exemplary embodiments, the SATO system may include the four following sub-systems: brand detection auto-review system, scene detection auto-review system, asset detection auto-review system, and active-passive (AvP) detection auto-review system. The system uses multiple layers, detection types, and algorithms that work symbiotically to represent a true and real-time picture, for example, of where sponsorships are displayed based on asset, scene, and active or passive exposure detection. The sponsorships may be displayed in the form of a sponsor message providing some text or image, such as a brand name (also referred to herein as a brand), a logo, a slogan, a text mentioning, a sports type, a league name, a team name, and so forth. In other words, the sponsor message may include one or any combination of the following: a brand name, a logo, a slogan, a text, a text mentioning, a sports type, a league name, a team name, and the like.

In contrast to conventional time consuming, costly, and error-prone systems that demand a lot of manual data annotation, the auto-review system disclosed herein is designed to output high quality, cost-effective, and time-efficient annotations that are used for supervised machine learning with minimal human intervention in the process, thus solving the problem of collecting large, robust and accurate data sets needed to train machine learning algorithms.

As used herein, "spotter" generally refers to an algorithm used to detect an object such as a brand, logo, slogan, or other target object, unless context indicates otherwise. "Spotter ID" generally refers to an identifier for which a particular algorithm is used in the spotting process, unless context indicates otherwise.

Further, as used herein, "brand detection" may include the identifying of a brand, logo, slogan, or other image or text within an image or video, as well as the size of the brand, logo, slogan, or image; its location within the image or video still; its timestamp in a video; the degree or sharpness of focus, and other important metrics.

"Scene" as used herein generally refers to a scenario depicted within the input image or video, such as a press conference or the playing of a game or sport.

"Asset" as used herein generally refers to the combination of an object and the brand, logo, slogan, image, or text contained within or on the object. In exemplary embodiments, an asset may include a corporate logo on a jersey or branded paneling in an arena.

Finally, "active versus passive" (AvP) as used herein generally refers to the detection and distinguishing between target objects that are natural parts of a scene, such as corporate logos on a jersey, as opposed to overlays, broadcast logos, or other digitally imposed objects. Exemplary embodiments may classify the former as "passive" and the latter as "active," although alternative embodiments may reverse these classifications or use different classifications entirely.

These definitions are not exclusive or restrictive and are intended as exemplars only. Context may indicate variations or supplemental meanings.

FIG. 1 is a detection diagram 100 showing a brand detection auto-review system classifying the brand detection results, if the brand detection is correct, according to an example embodiment.

Figure 2:
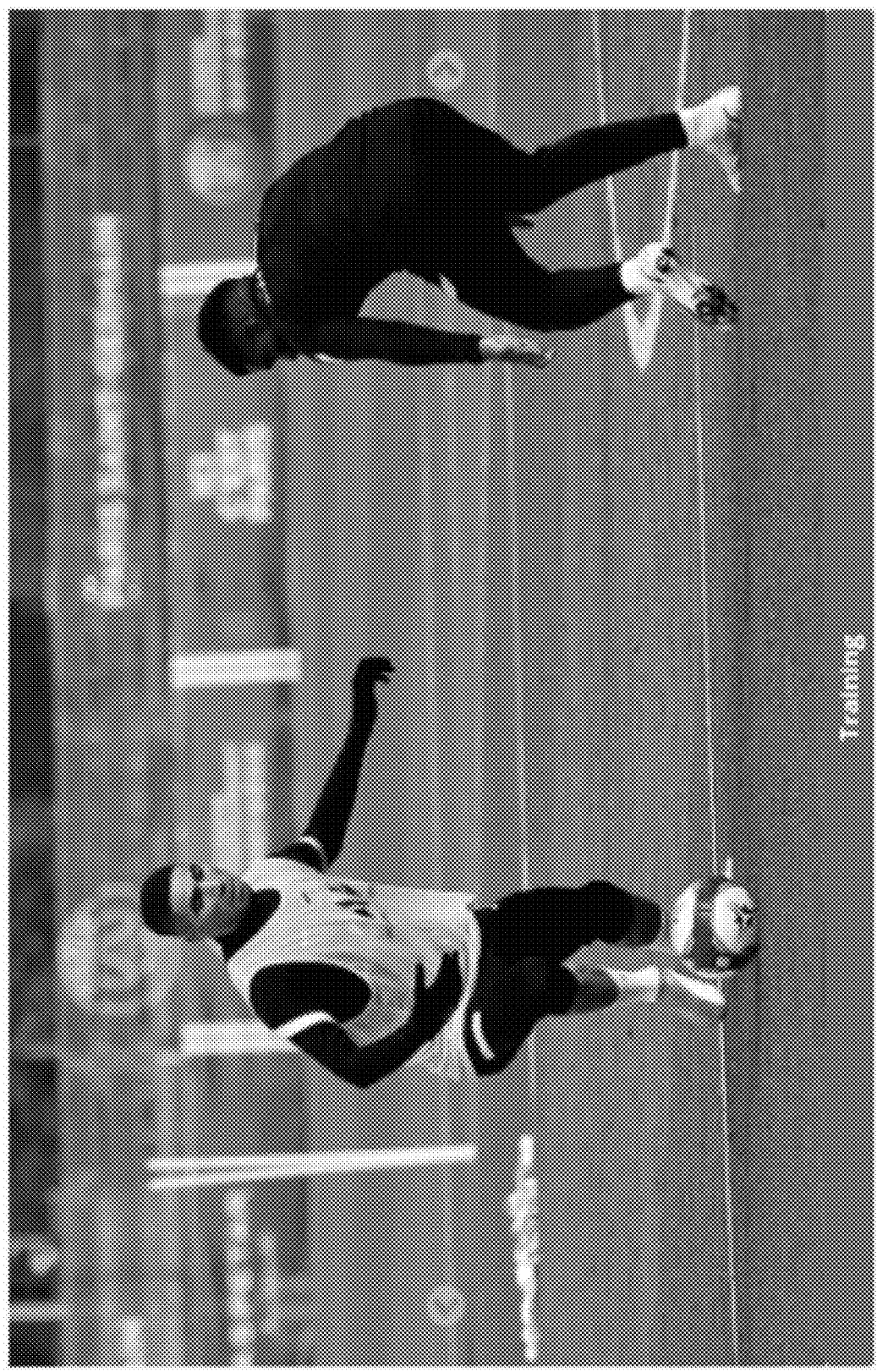
FIG. 2 is a detection diagram showing a scene detection auto-review system categorizing the scene detection label, according to an example embodiment.

FIG. 2 is a detection diagram 200 showing a scene detection auto-review system categorizing the scene detection label, if the CV model generated scene label is correct, to describe the input image or video, according to an example embodiment.

Figure 3:
FIG. 3 is a detection diagram showing an asset detection auto-review system, according to an example embodiment.

FIG. 3 is a detection diagram 300 showing asset detection auto-review system detecting, if the label "Uniform" is a correct label to describe the placement of the brands Lete™ and MSC™, according to an example embodiment.

Figure 4:
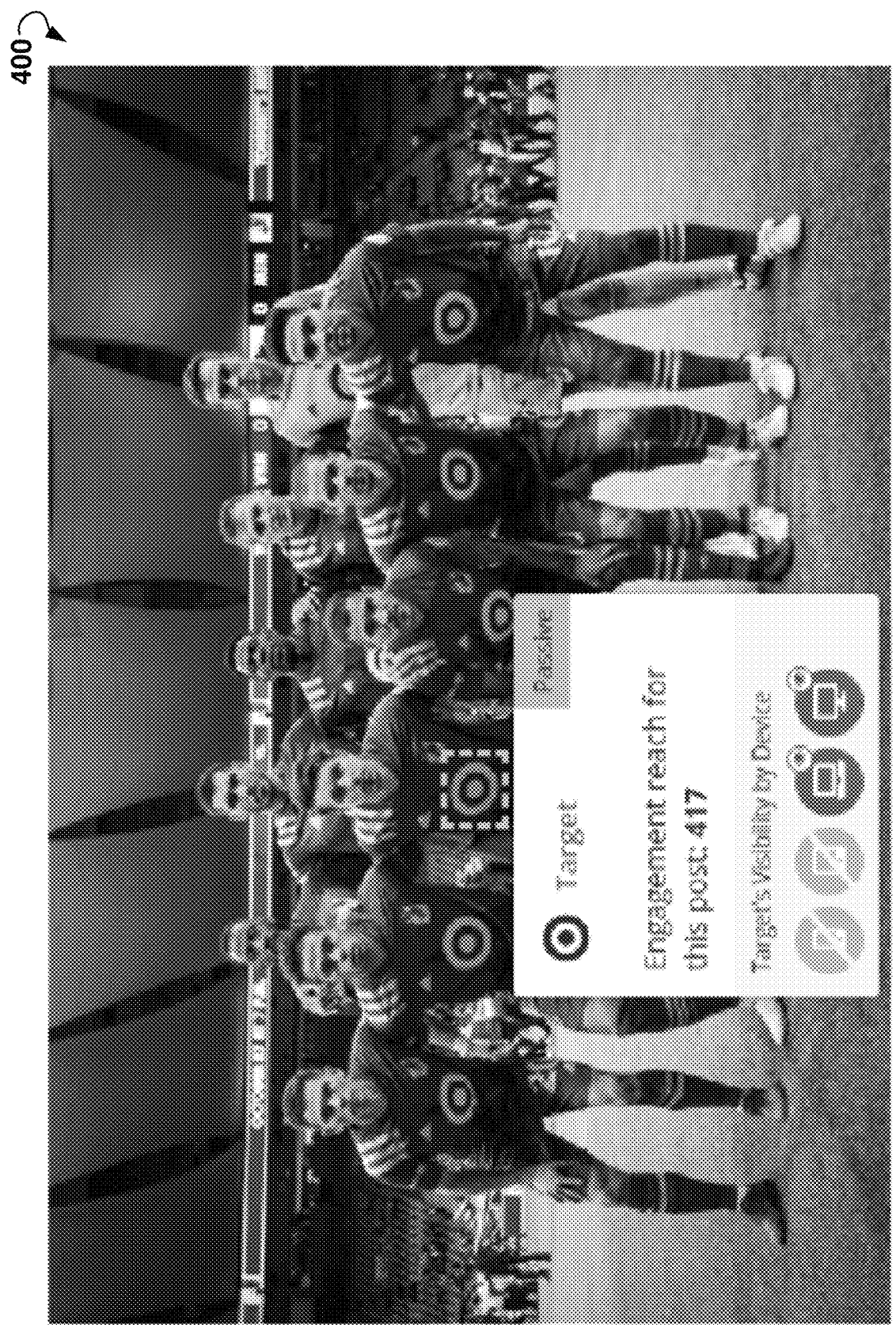
FIG. 4 is a detection diagram showing results from Active-Passive (AvP) detection with a passive tag detected, according to an example embodiment.

FIG. 4 is a detection diagram 400 showing results from AvP detection with a passive tag detected, according to an example embodiment. The SATO AvP is used to automatically classify the AvP passive given the input image in FIG. 4 is a correct AvP tag.

Figure 5:
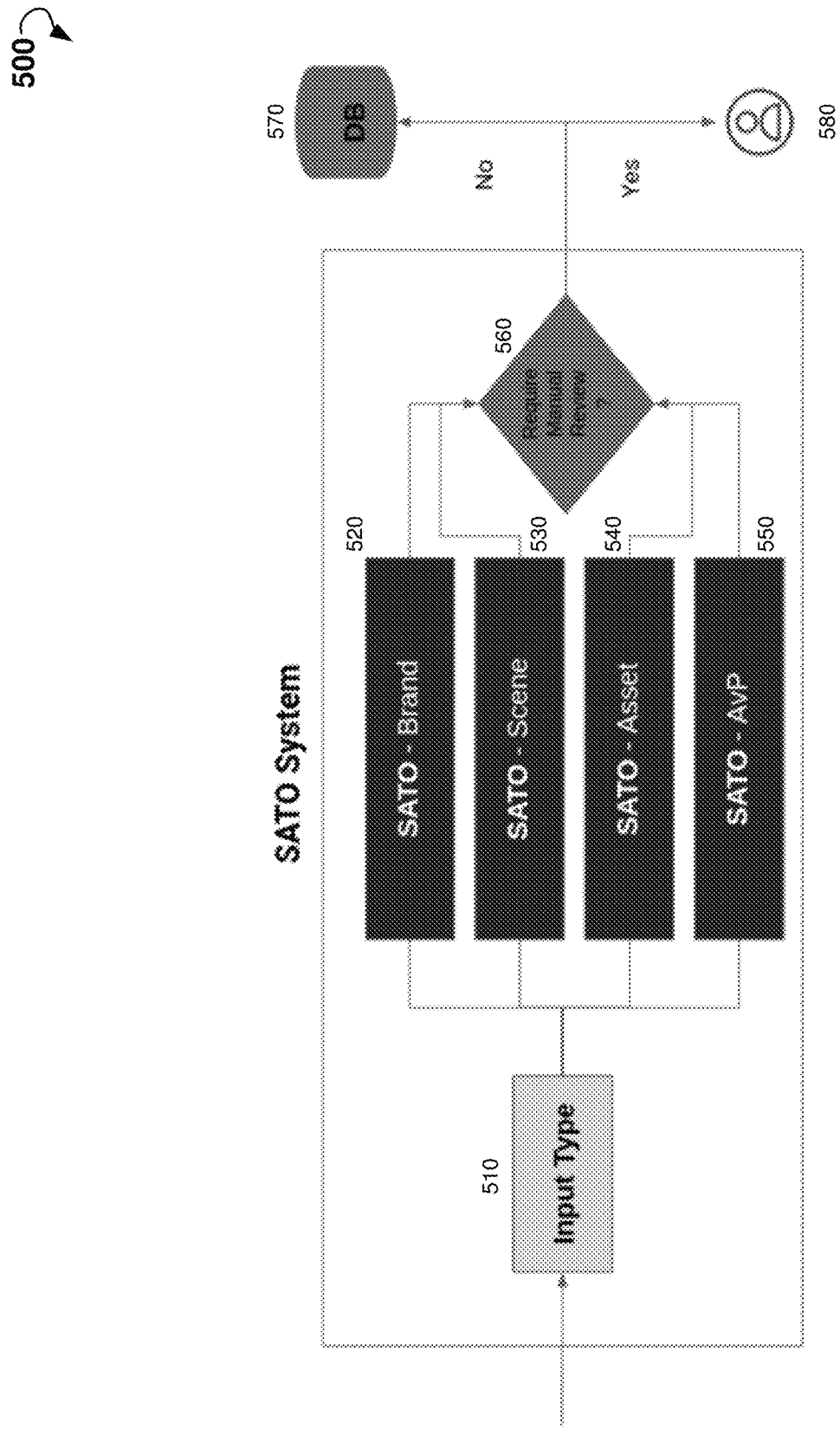
FIG. 5 is a block diagram showing a Structure Adaptive and Task Oriented (SATO) system, according to an example embodiment.

FIG. 5 is a block diagram showing the SATO system 500, according to an example embodiment. Given the detection input type 510, the requests of the SATO system 500 can be sent to different endpoints for classification. In the exemplary embodiment shown, the input may be processed through the brand detection subsystem 520, the scene detection subsystem 530, the asset detection subsystem 540, or the AvP detection system 550. After going through the SATO sub-system, a binary result 560 is output to indicate whether the respective input from the detection system requires manual review. If the SATO system output does not require manual review, the respective detection results can be marked as auto-review true and stored in a database 570. If the SATO system output requires manual review, the respective result can be enqueued for human input 580.

Figure 6:
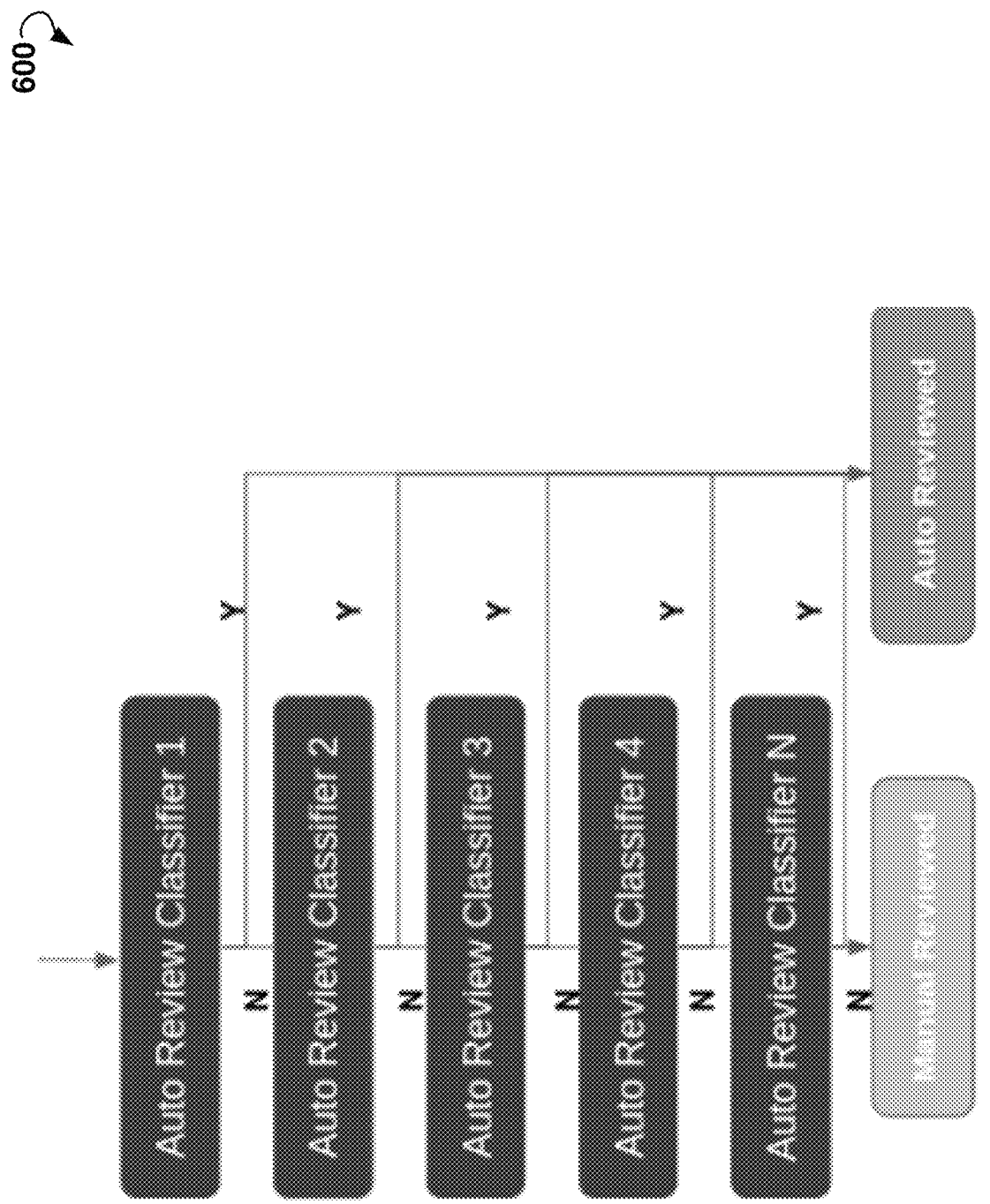
FIG. 6 is a block diagram showing an example structure of the SATO system that includes 4 subsystems, according to an example embodiment.

FIG. 6 is a block diagram 600 showing an example structure of the SATO system that includes four subsystems, according to an example embodiment. Each subsystem may share a similar structure. As shown in FIG. 6, the SATO subsystem may include a pipeline of multiple stages of classifiers stacked together. The number of stages in the SATO system can be adaptive to the task, such that the overall structure is adaptive to the classification task. Additional stages of classifiers can be added, or existing stages of classifiers can be removed from the system.

The stacking of the stages can be based on the goals of the respective subtasks. This type of the abstract design enables the SATO system to integrate other subsystems or additional stages without affecting the rest of the SATO system.

Figure 7:
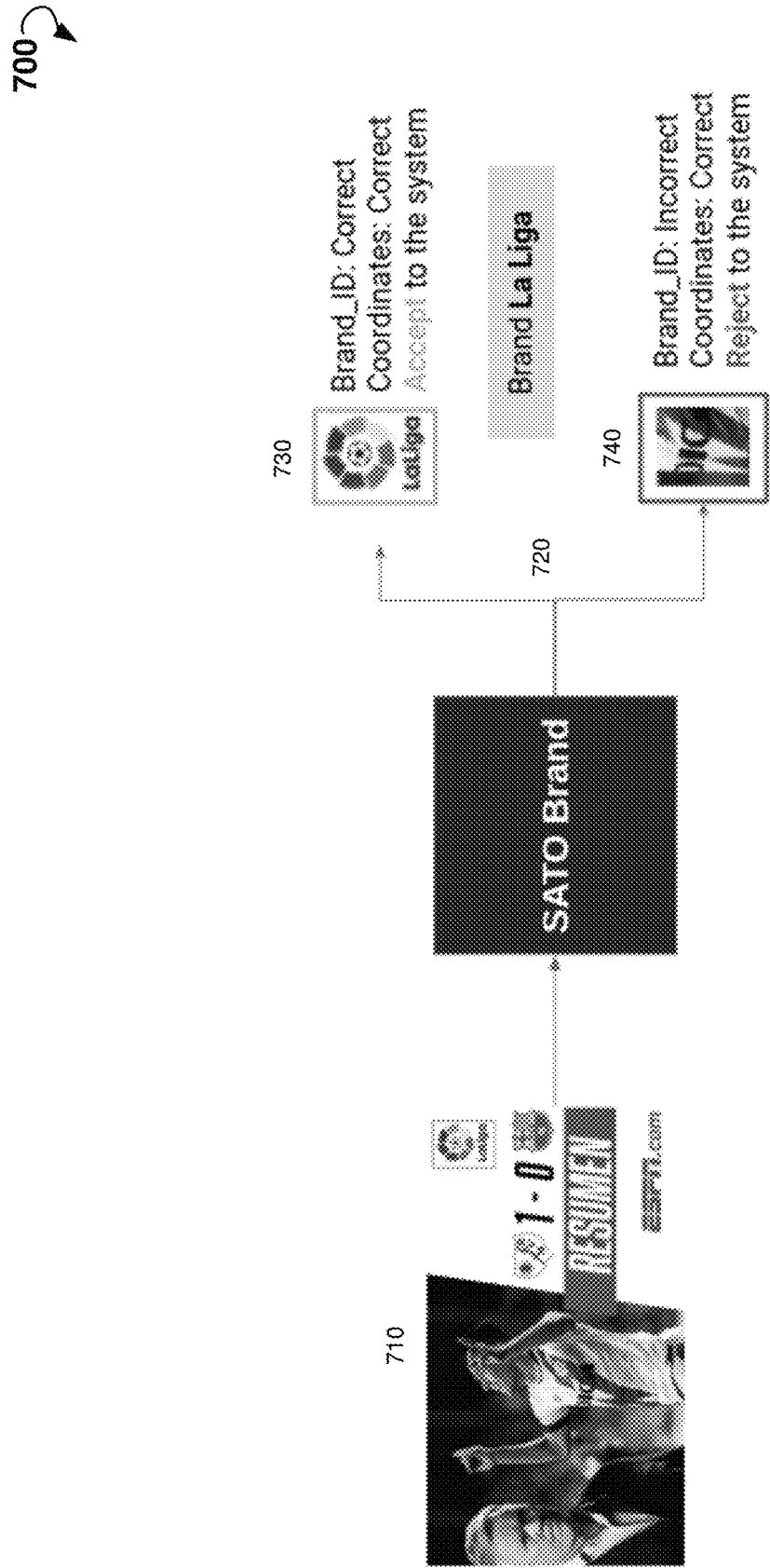
FIG. 7 is an example diagram representing an overview of the SATO-brand system, according to an example embodiment.

FIG. 7 is an example diagram 700 representing the overview of the SATO-brand system, according to an example embodiment. The input 710 of the SATO brand system can include both images and videos. The additional brand tag is indicated in the green bounding box with the brand name LaLiga™.

Assuming that the system of SATO-brand inputs the image as shown in FIG. 7 and two brand detection results, one is a bounding box 730 on the LaLiga™ brand in the image, the other is on the bounding box 740 on another region in the image, which is also categorized as the brand LaLiga™. The output of the SATO-brand system may include classification of the input tags based on the input image and the meta-information, including, but not limited to, brand ID and brand coordinates.

Thus, for each brand ID, SATO-brand system may output a binary variable 720 indicative of whether the brand detection is correct or not. The output from the SATO-brand may then affect statistical results generated by the system.

In FIG. 7, the top bounding box 730 indicates that the SATO-brand system outputs Auto Review True to the brand detection results and accepts the results automatically into the system for the flow down the stream. The bottom bounding box 740 indicates that the SATO-brand system outputs Auto Review False to the brand detection results, denies automatic review of the results and sends requests for manual review.

Figure 8:
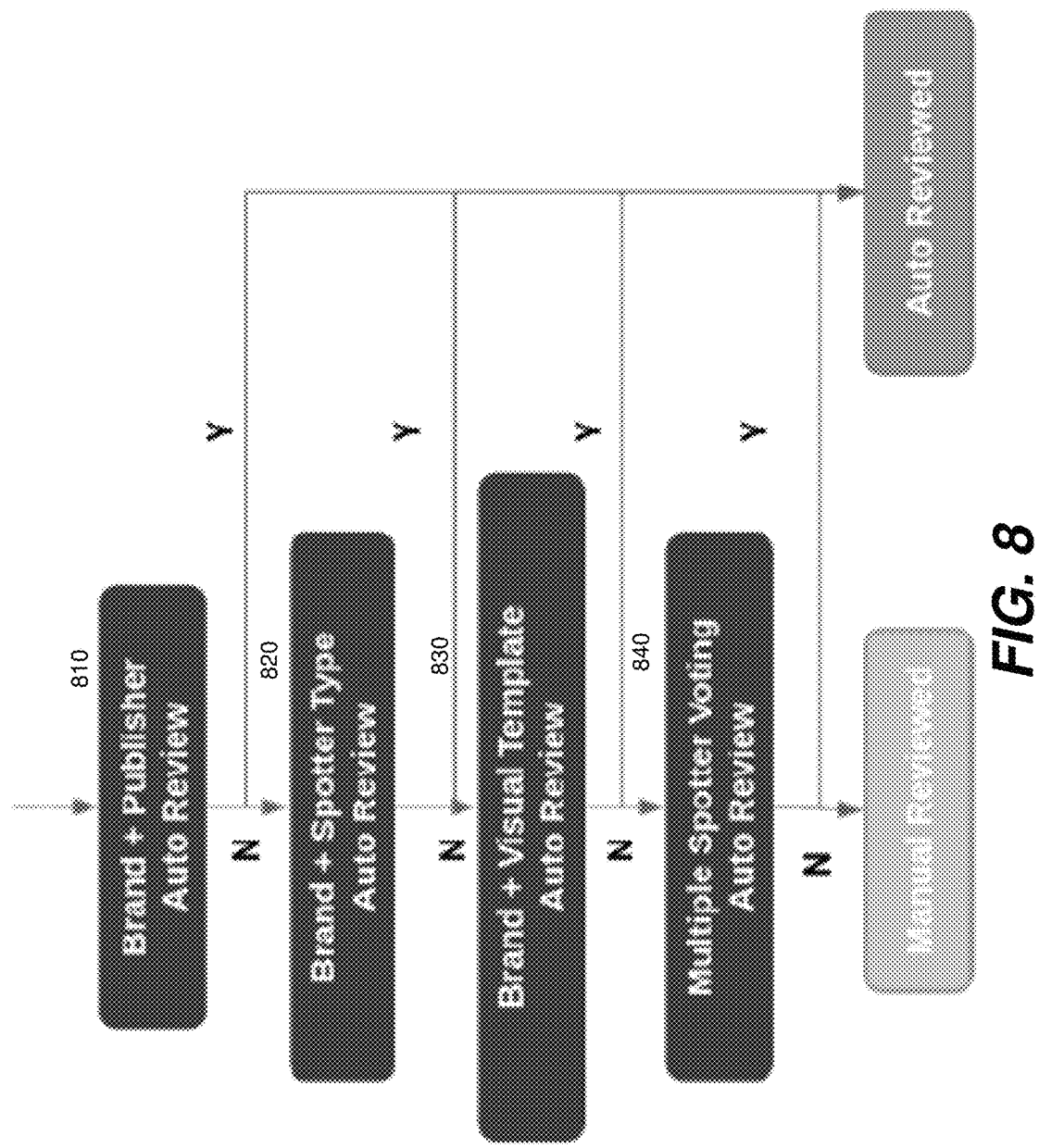
FIG. 8 is a block diagram showing the SATO-brand system, according to an example embodiment.

FIG. 8 is a block diagram 800 representing the SATO-brand system, according to an example embodiment. The system may include, but is not limited to, the following four stages:

Brand+Publisher classification 810;
Brand+Spotter type classification 820;
Brand+Visual appearance matching classification 830; and
Brand+Multiple spotter type classification 840.

Figure 9:
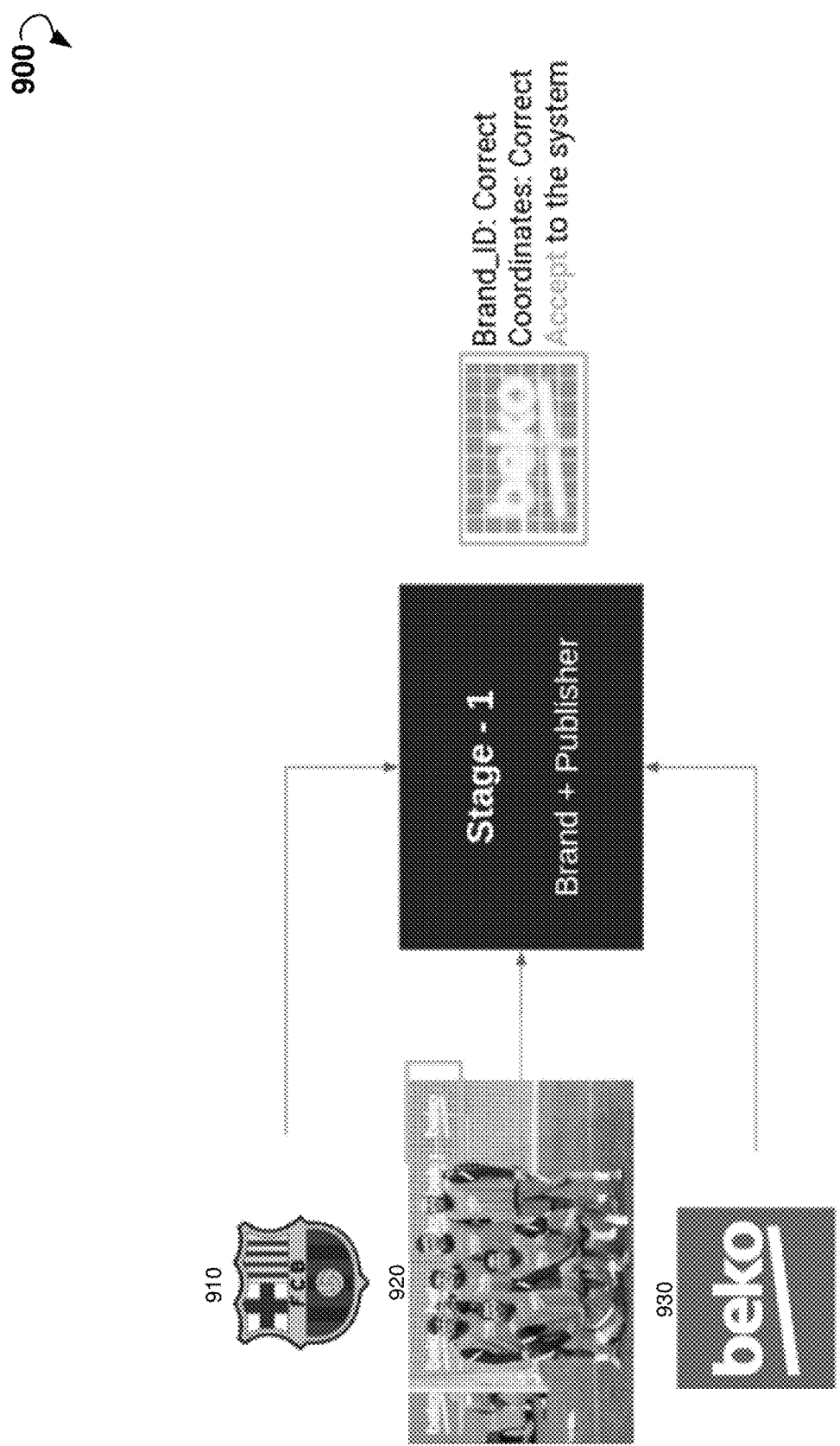
FIG. 9 diagrammatically shows the first stage of the system, Brand+Publisher classification, according to an example embodiment.

FIG. 9 is a diagram 900 showing the first stage of the system, i.e., Brand+Publisher classification, according to an example embodiment. The Brand+Publisher classification may receive the following input: Brand ID 930, Publisher ID 910, and Source image or Source video 920.

The brand ID 930 may include a unique identifier for a brand in the system. The publisher ID 910 may correspond to an entity in the system. A sample case of a publisher may include but is not limited to the following:

A team, e.g., Cleveland Browns; and
A league, e.g., National Football League.

Because of the official sponsorship relationship between the publisher and the brand such as Electronic Merchant Systems being the official partner with the Cleveland Browns, the brand appearing in the content from its official partners may be a strong indication that the brand has been spotted correctly. Similar indications can provide official jersey sponsors of soccer teams, such as Emirate Airlines to Real Madrid FC, Beko to FC Barcelona, and so forth.

The stage 2 of the SATO-Brand auto-review system may be a combination of brand ID and spotter type classification. The stage 2 may receive the following input:

Brand ID;
Spotter ID;
Source image or source video.

The brand ID may have the same definition as the brand ID in Stage 1 930. The spotter ID may be the unique identifier of the source detection type, where the brand ID and the detection results are generated. The spotter IDs in the system may be dynamic and growing. A subset of the spotter ID list in the system may include, but is not limited to, the following:

CMM;
YLM;
EPL;
MLS;
LaLiga; and
NBA.

Each of the spotter IDs may correspond to a spotter type specializing in a group of brands.

Figure 10:
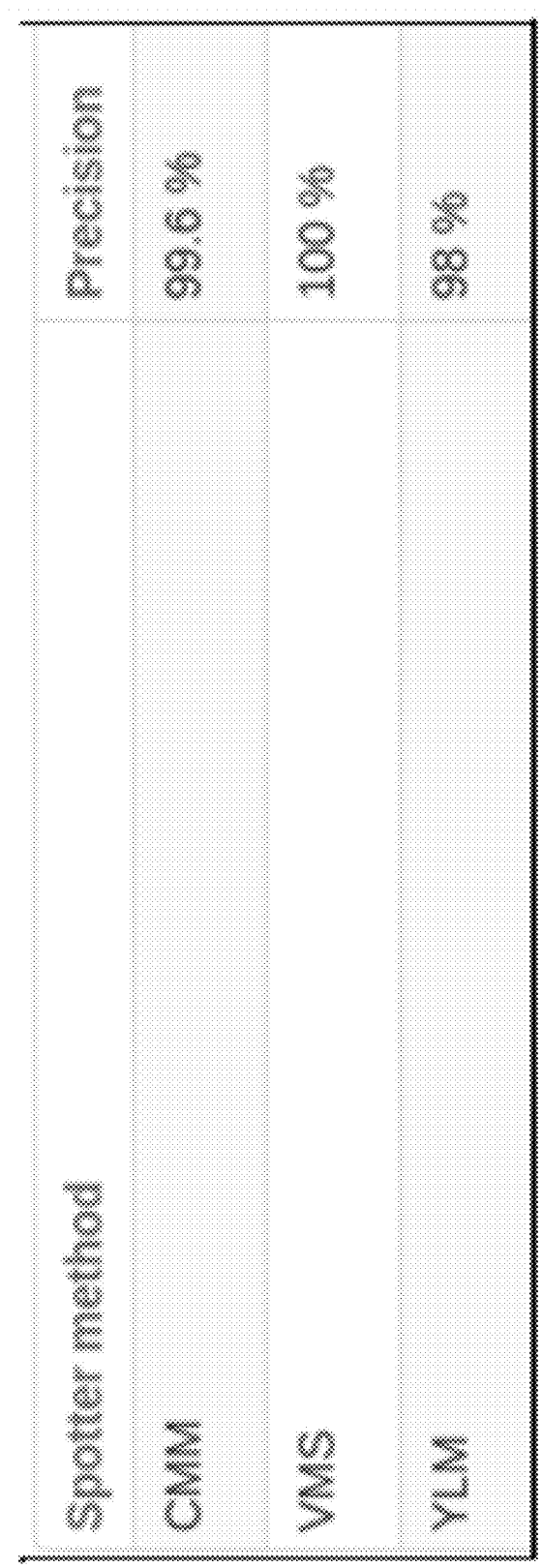
FIG. 10 diagrammatically shows the precision stats of the Samsung brand, according to an example embodiment.

FIG. 10 is a diagram 1000 showing precision statistics, which are generated by the brand ID and spotter ID pair in an exemplary embodiment. The statistics may be used to generate the confidence score for the detection results on particular brand ID and spotter ID combinations. The confidence score may be used in the stage 2 of SATO-Brand.

Figure 11:
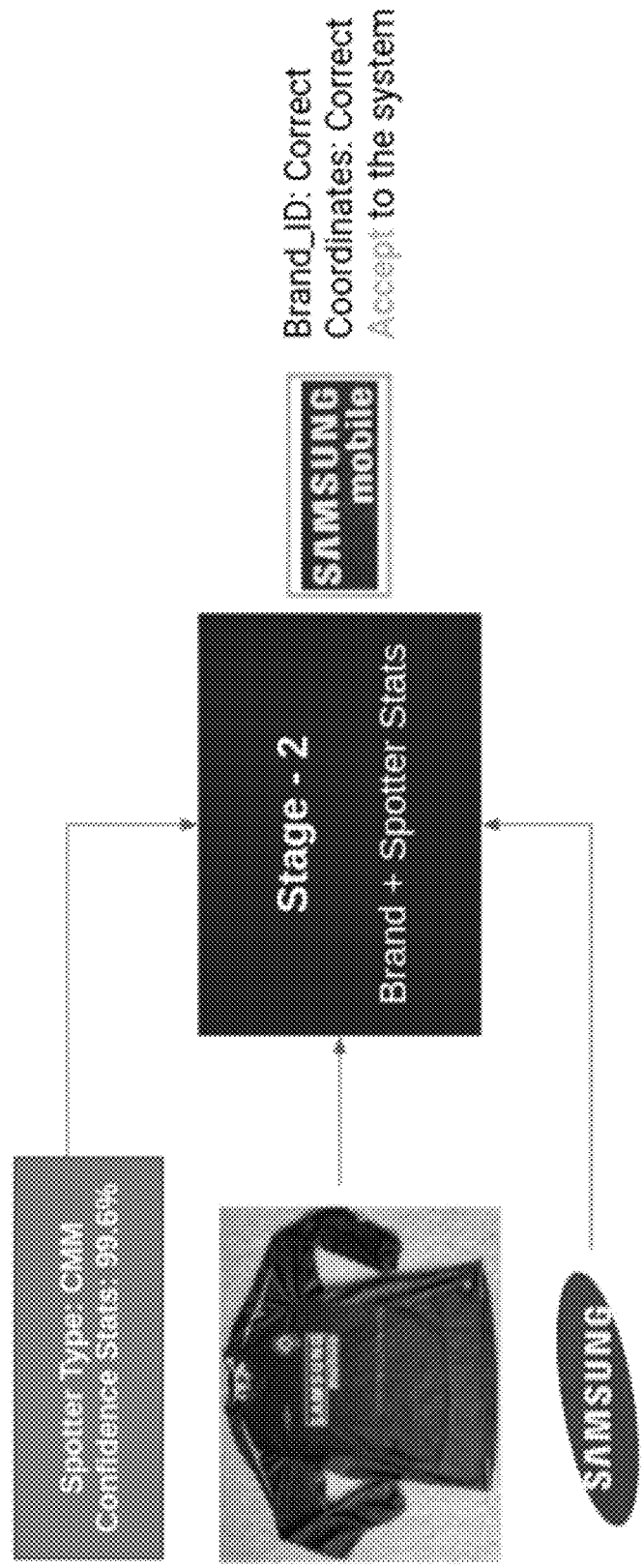
FIG. 11 diagrammatically shows the SATO Brand stage 2, Brand+Spotter Type, Auto Accept Case, according to an example embodiment.

FIG. 11 is a diagram 1100 showing the SATO Brand stage 2, Brand+Spotter Type, Auto Accept Case, according to an example embodiment. The goal of the SATO-Brand system is to automatically review the brand detection from other subsystems, to minimize the human efforts in the system. The correct brand detection can be automatically detected and the functionality of auto rejection on the detection can be supported as well. For example, in the SATO-Brand stage 2, given the historical stats, when a spotter type reports low confidence stats, the system may automatically reject the detection results from the brand ID+spotter ID combination.

Figure 12:
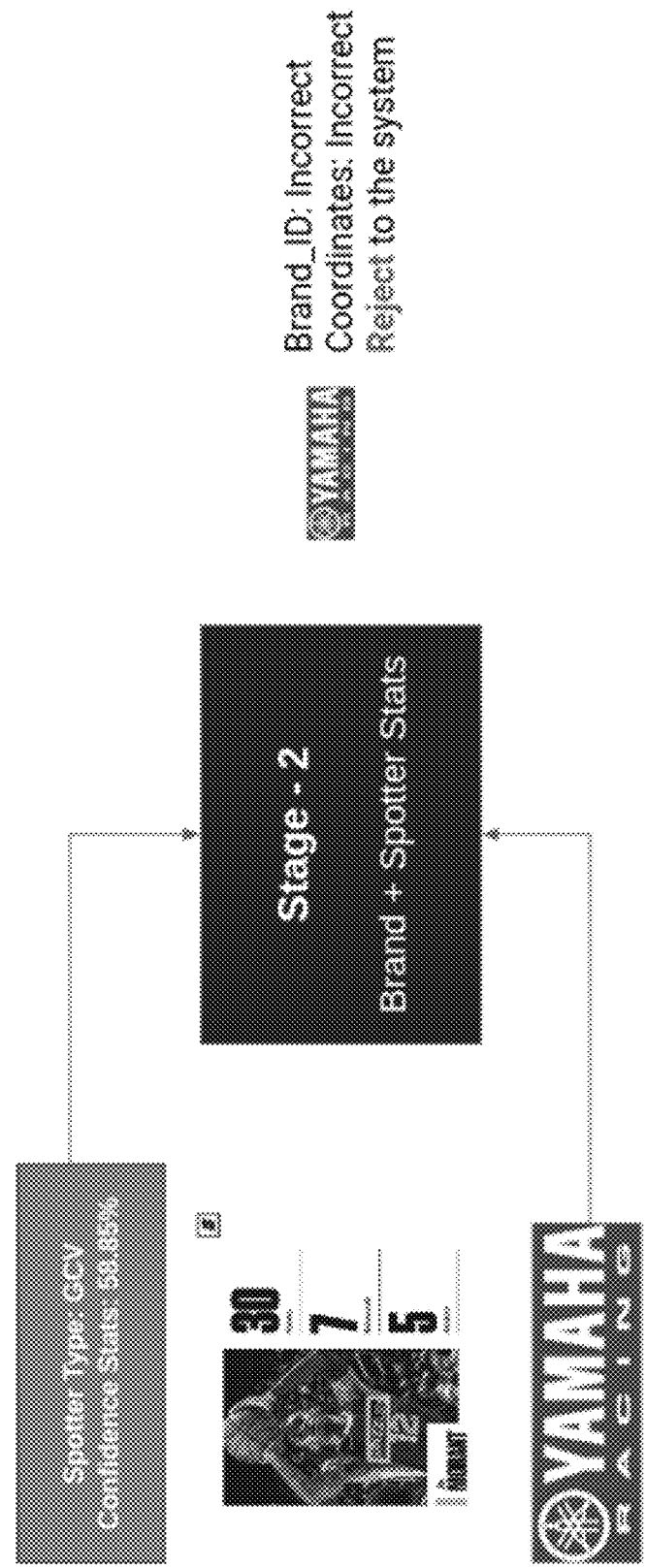
FIG. 12 diagrammatically shows the SATO Brand stage 2, Brand+Spotter Type, and Auto Reject Case, according to an example embodiment.

FIG. 12 is a diagram 1200 showing the SATO Brand stage 2, brand+Spotter Type, Auto Reject Case, according to an example embodiment.

The SATO-Brand system may have a prebuilt brand and logo database. The stage 3 of the SATO-Brand auto-review system is a classification based on the brand ID and the matched visual appearance. The stage 3 may receive the following as input:

Brand ID;
Matched logo template ID in the prebuilt brand and logo database; and
Source image or video.

The source image may match the logo template ID that has high historical stats in the detection precision. For example, Brand YAMAHA;
Prebuilt logo list;
YAMAHA logo 1—precision 100%—Auto Reviewed True;
YAMAHA logo 2—precision 99.9%—Auto Reviewed True;
YAMAHA logo 3—precision 99.8%—Auto Reviewed True.

The stage 3 may check the matched brand against the prebuilt logo, if the best matched prebuilt logo is configured as the auto review True, the detection results in stage 3 will be marked as auto review True.

The Stage 4 of SATO-Brand system may take into account the spotting results from multiple spotter types. As the listed sample spotter types in Stage 2, based on the same input image, there may be multiple versions of the brand detection results on the sample region in the image:

YLM, SAMSUNG on JERSEY;
EPL, SAMSUNG on JERSEY; or
LaLiga, SAMSUNG on JERSEY.

The state 4 may aggregate the brand detection results from multiple spotter types, and outputs the auto review True, when multiple spotter types detect the same brand in the same region in the input image or video.

After passing the input through the SATO-Brand system, if there are any stages for the given inputs output auto review True, the detection result may be automatically approved. If SATO Brand outputs False on automatic approval, then the detection may be forwarded for human review.

The SATO-Scene is one of the auto-review systems which may provide a binary decision for the given input image/video and the input scene tag to denote whether the detection is correct and can be auto-reviewed or not.

The inputs to this SATO-Scene sub system may be the following:

Image/Video post;
Detected scene tag;
Detection type of the scene tag;
Publisher of the post; and
Media type of the post.

The output of this system may be a binary decision whether the scene detection results can be automatically reviewed or not.

Figure 13:
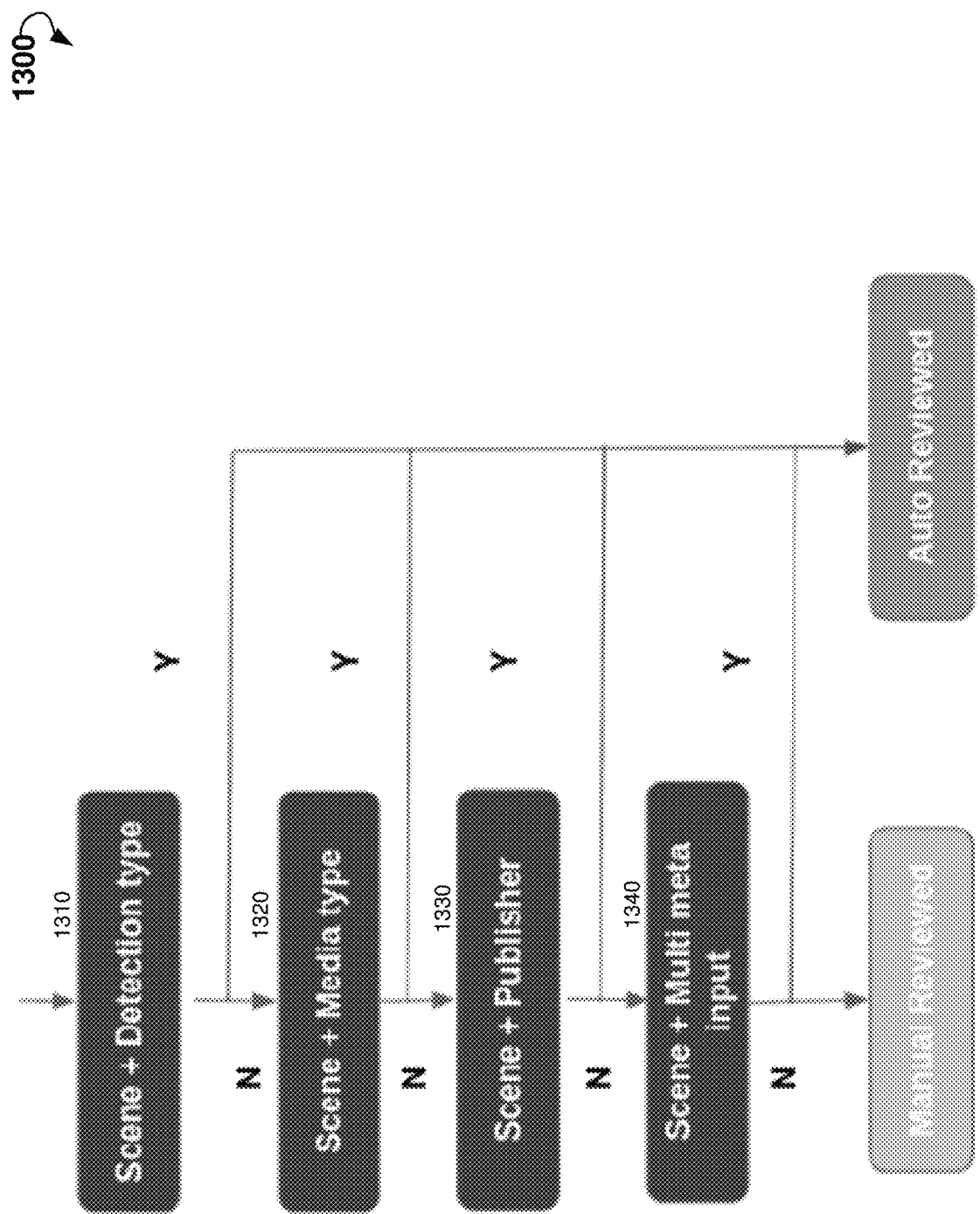
FIG. 13 is a block diagram showing the overall architecture of SATO-Scene system, according to an example embodiment.

FIG. 13 is a block diagram 1300 showing the overall architecture of SATO-Scene system, according to an example embodiment. SATO-Scene system may mainly include four stages to provide a decision:

Scene+Detection type 1310;
Scene+Media type 1320;
Scene+Publisher 1330; and
Scene+Multi-meta input 1340.

Figure 14:
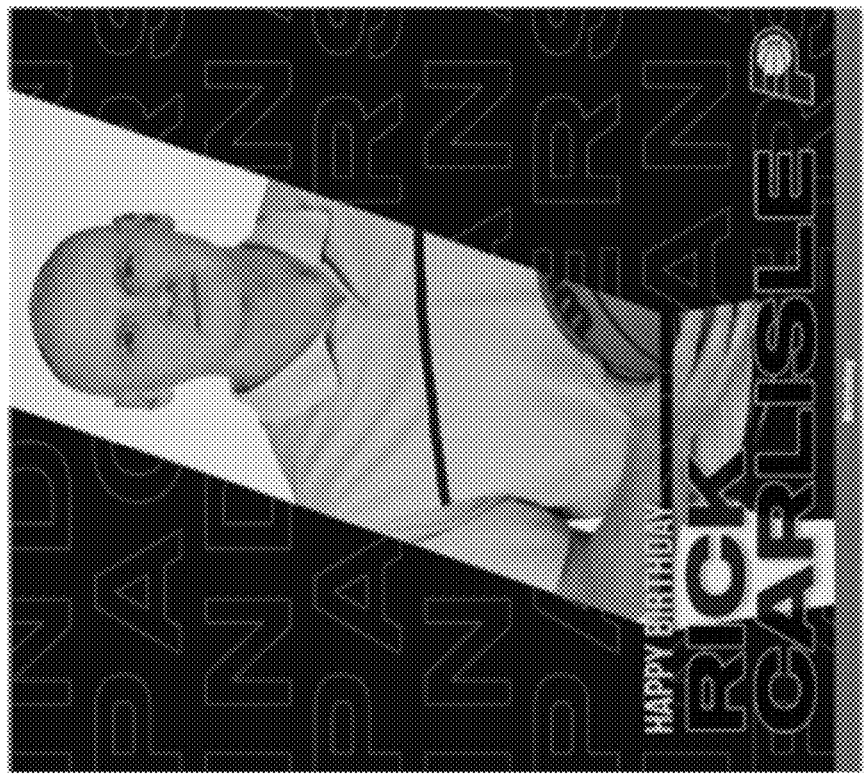
FIG. 14 diagrammatically shows text-based scene detection, according to an example embodiment.

In general, it is possible to set up a classifier rule stating to approve/reject a scene tag when it is detected with any of the following methods. Detection type for a scene can be categorized into the following types:

Description method. Every post may contain a description attached after the customer uploads it in the social media. The Scene classification system may look for certain keywords in each post and select the appropriate scene tags based on the match. These kinds of tags may carry the detection type as a description method. For example, one image and description of an input post is shown in FIG. 14, which is a block diagram 1400 showing a text-based scene detection, according to an example embodiment. The scene tag is birthday, and the description of the post contains a text wish for the player for his birthday. In these scenarios, it is direct and obvious to approve the detection, given it matches the description of the post. Without any human intervention, the SATO-Scene system could identify cases like above and approve automatically.

OCR method. Similar to the Description method, the scene classification system may look for keywords in the image if it is not able to recognize the same in the description. It employs an Optical Character Recognition (OCR) system to extract the text from the image. In the above scenario of the birthday post of FIG. 14, if there is no description, the scene classification system would have scanned the image using OCR and tagged the post with the birthday scene tag. In this scenario, the SATO-Scene system may identify the matching auto review rule in the database and automatically approve the detection.

Machine learning method. It represents the third detection type with which it is possible to classify an input with a scene tag when the previous method fails to do so. Based on historic detections and its approvals, it is possible to create an auto review rule to approve/reject a scene tag when it is detected using a Machine learning method.

The second stage of the SATO-Scene system is to check for auto review rules which have a combination of the scene tag and a particular media type (image or video). If there is a pattern of correct scene detections of "Action" with image inputs, the SATO-Scene system may support adding an auto review rule which could automatically approve posts with Action+image media combinations. An example may be the auto approved "Birthday" when detected in an image.

The third stage of the SATO-Scene system is to check for auto review rules that have a combination of input scene tag and a publisher. For example, if the posts from Real Madrid always carry the correct detections for the scene tag "Training", then this system can help to add a rule to automatically approve the detections of "Training" which are published by Real Madrid. Detections may not be so accurate across all the posts in a single media like in Stage 2. This stage helps to narrow down any potential false approvals/rejections. Auto reject "Action" when detected in Real Madrid posts may serve as an example.

The fourth stage of the SATO-Scene system is the most flexible stage where the user can input one or more metatags along with the scene tag. This can represent all above stages together. The purpose of this flexibility is to provide independence in adding classifiers to specific publishers and/or specific detection types, and so forth. Here are some examples of this stage rules:

Auto Accept "Action" scene tag when detected in Real Madrid and detected with OCR method; and Auto Reject "Birthday" scene tag when detected with description method and in video posts.

After passing the input post through the SATO-Scene system, if there are any satisfying rules for the given inputs, then the detection may be automatically approved. If there are no matching rules, then the detection may be forwarded for human approval.

Similar to SATO-Brand, SATO-Asset may accept images or videos as its input and determine if a given Brand+Semantic Object of Interest (Referred to as an SOI) combination is valid and can be auto-reviewed. This combination of SOI and Brand is referred to as an asset.

Unlike SATO-Brand, the first category of the SATO-Asset, Sports+Publisher classification may be performed before SOI detection. Using sport types associated with a publisher, a given item can be preemptively prevented from being sent to any sport-specific SOI spotter outside the ones designated, preventing false positives due to improper sport types. By sending only to the designated sports, SATO-asset is able to prevent totally uncorrelated false positives.

SATO-Asset may also be unique in that it contains a multimodal rule, i.e., SOI/publisher/brand. This category may permit users to create any combination of SOI, publisher, and brand to auto-review items. For example, digital overlays from a broadcasting company (e.g. Bally Sports) may only ever appear as part of the "Broadcast Logo Bug" SOI label. Using the multimodal rule, a user could then add a rule to auto-accept Assets generated from SOI "Broadcast logo bug" with brand "Bally Sports" from publisher "Bally Sports." If this rule applies across every publisher, the user could omit publisher "Bally Sports" and "Bally Sports"+ "Broadcast Logo Bug" would then be auto-reviewed system wide.

Conversely, if there is not a "Broadcast Logo Bug" label in the applied asset model, it is possible to prevent any assets from forming with "Bally Sports" by applying a multimodal rule.

Figure 15:
FIG. 15 diagrammatically shows the FP on Asset, according to an example embodiment.

FIG. 15 is a diagram 1500 showing the FP on Asset, according to an example embodiment, which may serve as an example. A user could prevent the formation of Ballysports assets for a given publisher by creating a multimodal rule which auto-rejects any asset which contains "Bally Sports". In this case, the assets are "Bally Sports" and "Dasher Board" from a specified publisher. As mentioned above, if this rule should apply system wide, the user can also omit a specified publisher. The ability to make more or less generic rules provides extra flexibility across multiple spaces to handle asset auto-review.

SOI+Scene classification allows SATO-Asset to use Scene data to determine whether or not an asset can be auto-reviewed. For example, the SOI Label "Step and Repeat" is commonly seen at posts detected with the "Press Conference" scene.

Figure 16:
FIG. 16 diagrammatically shows Step and Repeat SOI with Magners, Adidas, and Dafabet Assets, according to an example embodiment.

FIG. 16 is a diagram 1600 showing Step and Repeat SOI with Magners, Adidas, and Dafabet Assets, according to an example embodiment. There is a Scene label, "Press Conference" as well. Using both of these, it is possible to create an SOI+Scene classification rule to auto-accept any assets from a post which contains the "Step and Repeat" SOI label and the "Press Conference" Scene label.

Figure 17:
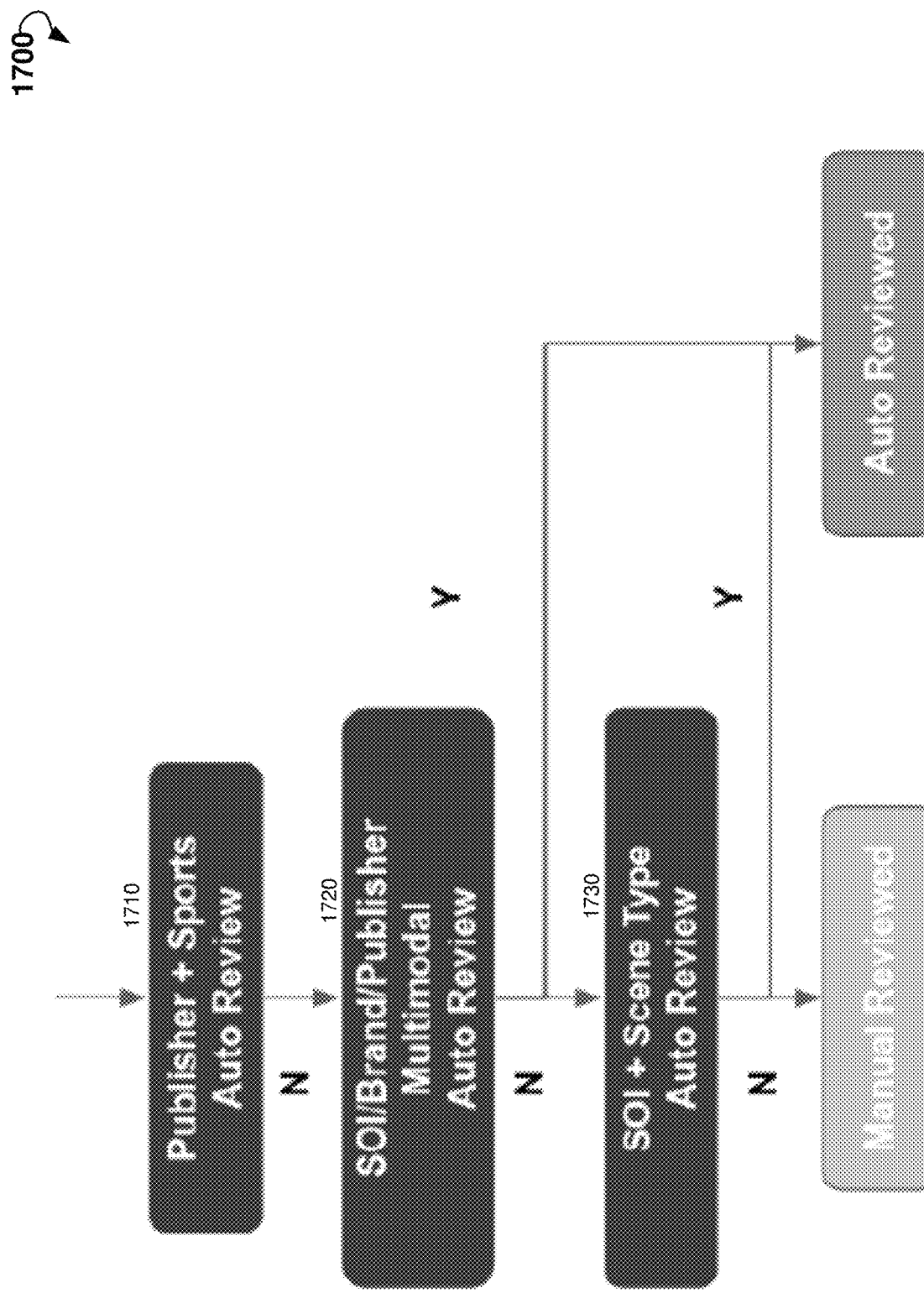
FIG. 17 is a block diagram illustrating SATO-Asset including 3 stages, according to an example embodiment.

FIG. 17 is a block diagram 1700 showing that SATO-Asset can include 3 stages, according to an example embodiment:

Asset+Sports classification 1710;

Asset+Brand/Publisher Multimodal classification 1720; and

Asset+Scene Type classification 1730.

In the SATO-Asset system, asset types are grouped under sports types. The sports types in the system for asset detection may include:

Soccer;

Sailing;

Hockey; and

Basketball.

The above list may be dynamic and keep expanding to cover more sports types. Each of the above sports types may correspond to a set of asset labels. For example, in the Basketball asset label group, the asset labels in this group may include Stanchion LED, Stanchion ARM, and Stanchion Pole Pad. The above list may be a subset of the complete asset labels under the group Basketball.

Figure 18:
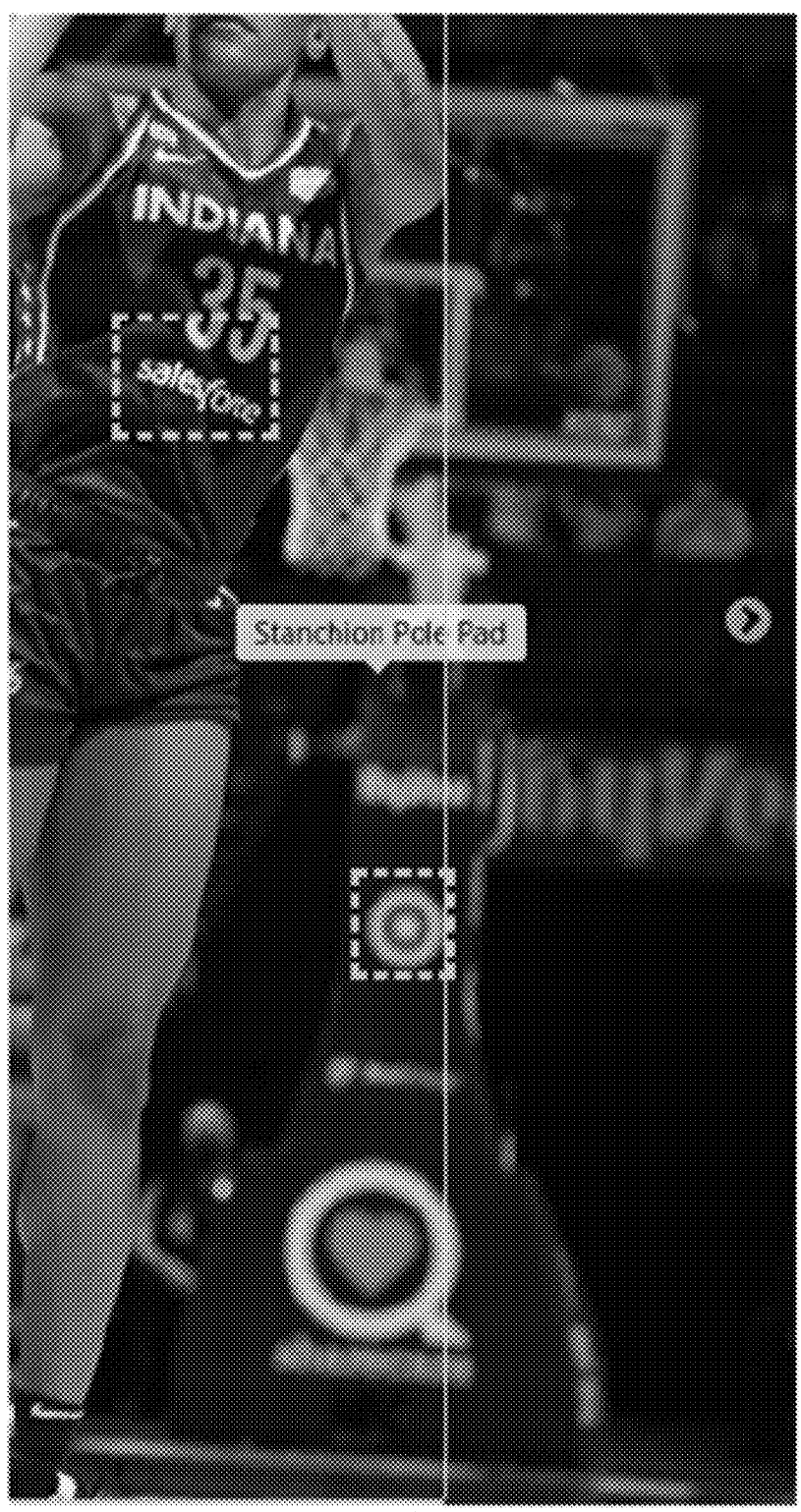
FIG. 18 diagrammatically illustrates an example of Stanchion Pole Pad in Basketball, according to an example embodiment.

FIG. 18 is a block diagram 1800 illustrating an example of Stanchion Pole Pad in Basketball, according to an example embodiment. With the current design shown in FIG. 18, the input image may be first categorized by its sport type and designated to the sports type basketball related group of asset labels. The detection of the asset labels may be then limited to the basketball related only asset labels. The asset label, for example, Dasher Board in hockey, in this design, is eliminated from the asset detection results.

Due to the sponsorship relationship in the sports domain, there are certain combinations among asset label—brand—publisher, indicating strong bonds when appearing together.

Figure 19:
FIG. 19 diagrammatically illustrates an example of a publisher+brand+asset label, according to an example embodiment.

FIG. 19 is a diagram 1900 illustrating an example of publisher+brand+asset label, according to an example embodiment. As shown in FIG. 19, the source images or video from Anaheim Ducks have a strong association between the brand Bauer and the asset Helmet. This type of association may be taken into account in the stage 2 of the SATO-Asset system. The stage 3 of the SATO-Asset may consider the relationship between the asset label and the scene label as the input.

As illustrated in FIG. 16, the detection of a scene as "Press Conference" may indicate a strong signal in the appearance of the asset label Step and Repeat. In Stage 3, the classification may be made upon the relationship between the asset label and scene label. If there are any stages for the given inputs output auto review True, then the detection result may be automatically approved. If SATO-Asset outputs False on automatic approval, then the detection may be forwarded for human review.

SATO-AvP may be one of the auto review systems which provides a binary decision for the given input image/video and the input active/passive tag to denote whether the detection is correct and can be auto-reviewed or not. The inputs to this system may be the following:

Image/Video post;

Detected active/passive tag;

Spotted associated brand in the same image/video;

Publisher of the post;

Detected Asset tag; and

Detected Scene tag.

The output of the system may be a binary decision as to whether the detection can be automatically reviewed or not.

Figure 20:
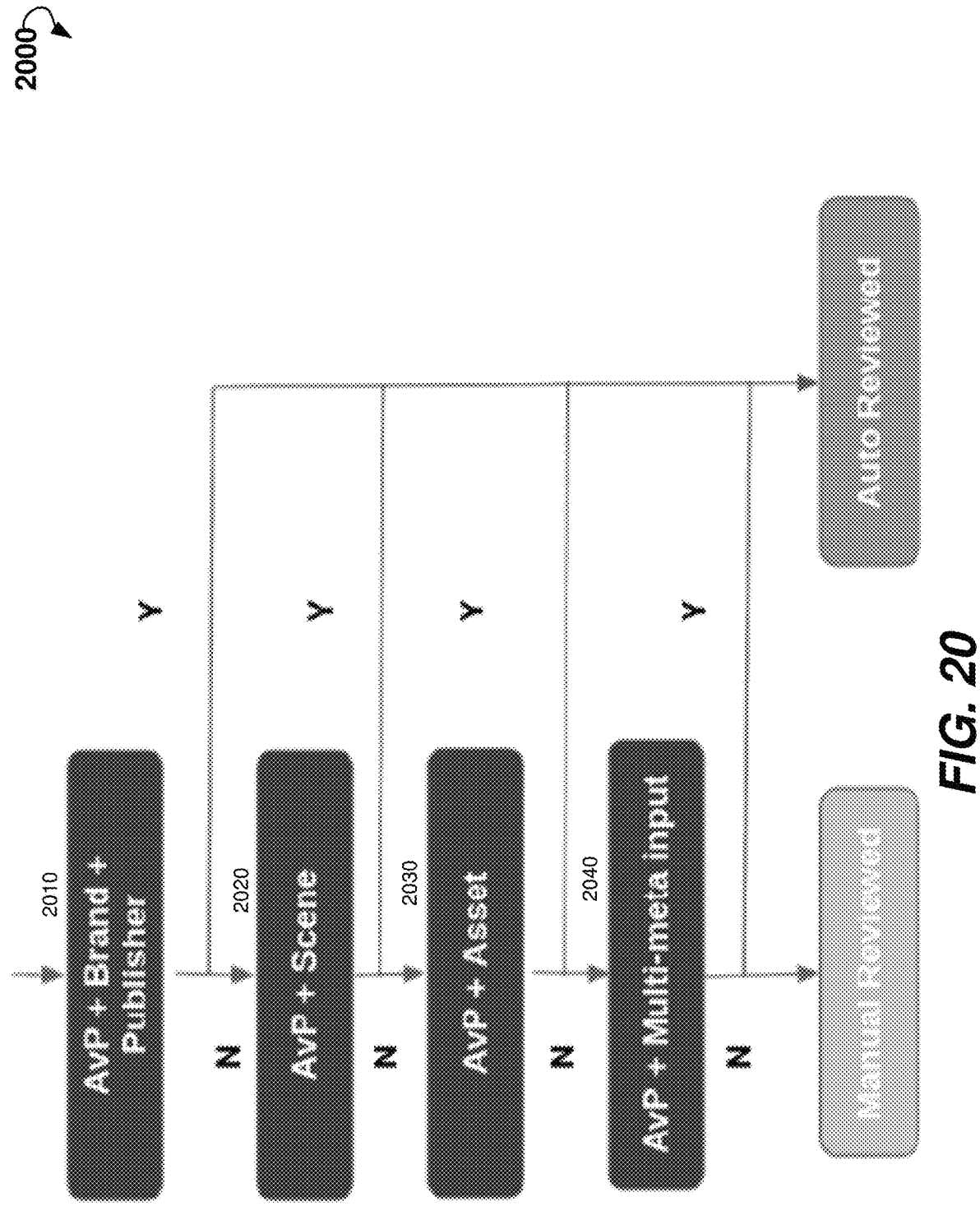
FIG. 20 is a block diagram denoting the overall architecture of SATO-AvP system, according to an example embodiment.

FIG. 20 is a block diagram 2000 denoting the overall architecture of SATO-AvP system, according to an example embodiment. The SATO-AvP system may have 4 stages in the pipeline:

AvP+Brand and Publisher 2010;

AvP+Scene 2020;

AvP+Asset 2030; and

AvP+Multi-meta input 2040.

The first stage of the SATO-AvP system may be to check for classifier rules which have a combination of input AvP tag, a publisher, and a brand.

Active-passive tags may be detected only when there is a brand tag detected. This type of rule can make sure to match the given active/passive tag, a brand tag, and the publisher of the post.

For example, if the posts from MLS always carry the correct detections for the passive tag when detected along with the brand tag "Audi," then the system could accommodate adding a rule to automatically approve the detections having the "a Audi" passive tags of posts which are published by MLS.

The second stage of the SATO-AvP system may include checking for auto review rules that have a combination of an input AvP tag and a scene tag. This type of auto review rule may help to reduce human interaction to review active/passive tags by having background knowledge of the scene tags present in the post. When the active/passive tag is spotted in a post that contains a particular scene tag, it can either be approved or rejected based on the rules configured. For example, brands that are spotted in a post containing press conference scene tags, can automatically be approved as a passive tag.

Figure 21:
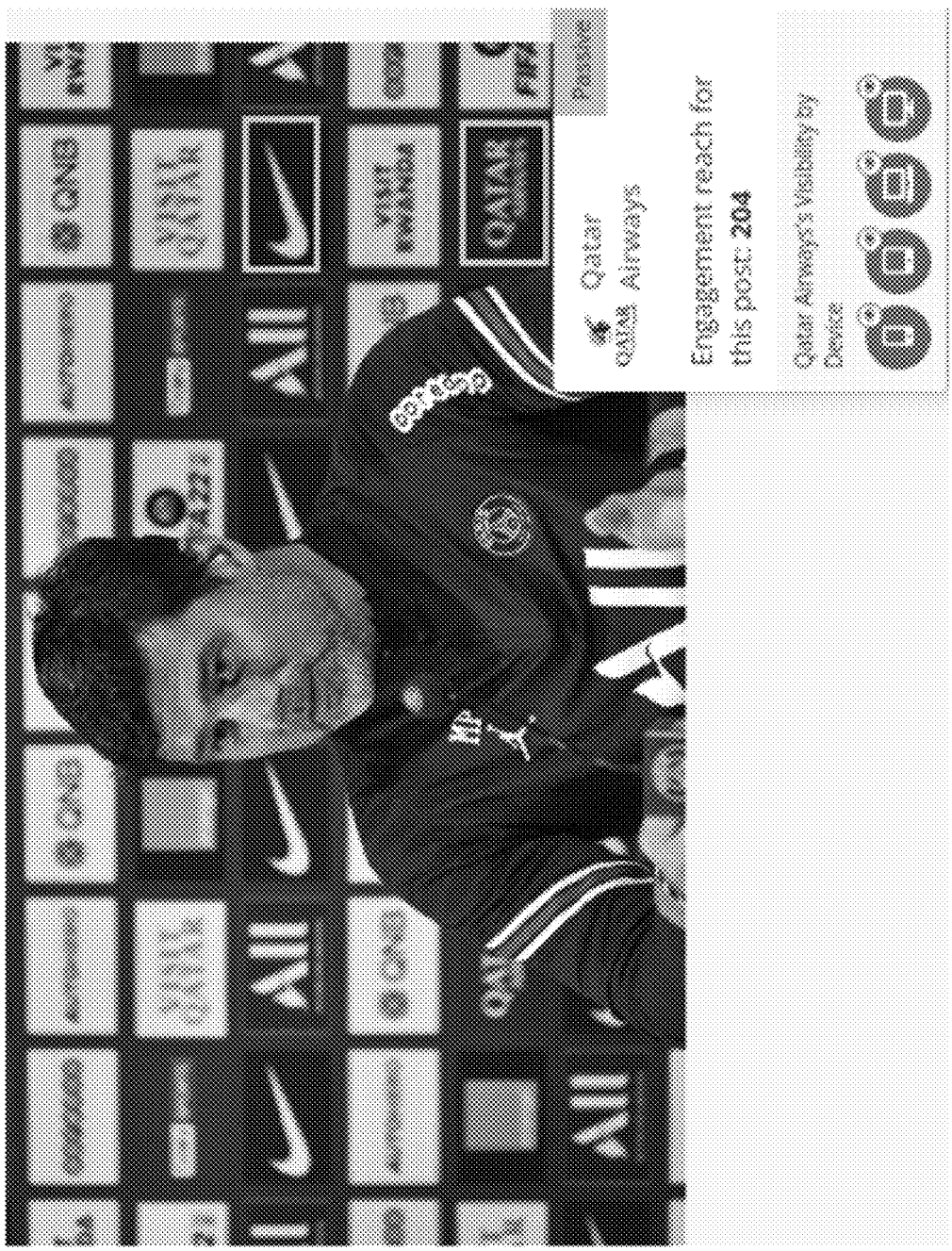
FIG. 21 diagrammatically shows a press conference passive tag, according to an example embodiment.

FIG. 21 is a block diagram 2100 showing a press conference passive tag, according to an example embodiment.

The third stage of the SATO-AvP system may be to check for classifier rules that have a combination of an input AvP tag and an asset tag. This type of classifier rule may help to reduce human interaction needed to review active/passive tags by having background knowledge of the asset tags present in the image/video. When the active/passive tag is spotted in a post that contains a particular asset tag, it can be either approved or rejected based on the rules configured.

Figure 22:
FIG. 22 diagrammatically represents an example of a passive tag on a uniform, according to an example embodiment.

FIG. 22 is a diagram 2200 representing a passive tag on uniform, according to an example embodiment. It shows a post containing a uniform asset tag over a couple of brands, the passive tag for brand "three" can be automatically approved. Brands on a uniform/human will always be passive. This kind of rule may actually reduce the manual review for 60% of the posts in production.

Similar to the SATO-scene, the fourth stage of the SATO-AvP system may be another flexible stage where the user can input one or more meta tags along with the AvP tag. This could represent all the above stages together. Here are some examples of this stage rules:

Auto Approve passive tag when detected in Real Madrid and detected with the "Audi" brand;

Auto approve passive tag when detected in Chelsea, along with a scene tag "Uniform" for brand "three" (Similar to FIG. 22); and After passing the input post through the SATO-AvP system, if there are any satisfying rules for the given inputs, then the detection is automatically approved. If there are no matching rules, then the detection is forwarded for human approval.

Figure 23:
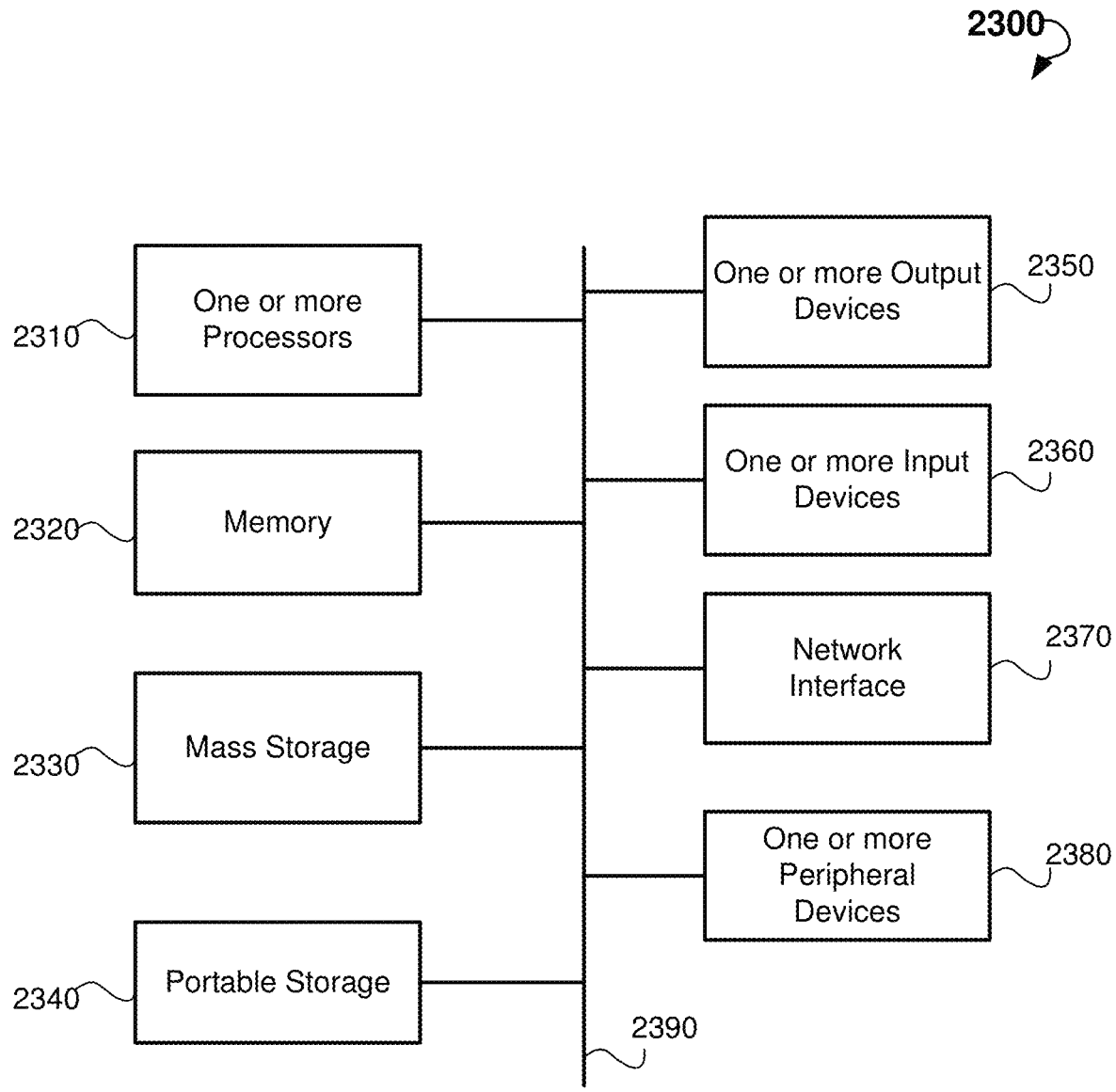
FIG. 23 shows a computing system that can be used to implement a system for cascade auto-review system for automated classification and annotation of input, according to an example embodiment.

FIG. 23 illustrates an exemplary computing system 2300 that can be used to implement embodiments described herein. The exemplary computing system 2300 of FIG. 23 may include one or more processors 2310 and memory 2320. Memory 2320 may store, in part, instructions and data for execution by the one or more processors 2310. Memory 2320 can store the executable code when the exemplary computing system 2300 is in operation. The exemplary computing system 2300 of FIG. 23 may further include a mass storage 2330, portable storage 2340, one or more output devices 2350, one or more input devices 2360, a network interface 2370, and one or more peripheral devices 2380.

The components shown in FIG. 23 are depicted as being connected via a single bus 2390. The components may be connected through one or more data transport means. The one or more processors 2310 and memory 2320 may be connected via a local microprocessor bus, and the mass storage 2330, one or more peripheral devices 2380, portable storage 2340, and network interface 2370 may be connected via one or more input/output buses.

Mass storage 2330, which may be implemented with a magnetic disk drive or an optical disk drive, is a non-volatile storage device for storing data and instructions for use by a magnetic disk or an optical disk drive, which in turn may be used by one or more processors 2310. Mass storage 2330 can store the system software for implementing embodiments described herein for purposes of loading that software into memory 2320.

Portable storage 2340 may operate in conjunction with a portable non-volatile storage medium, such as a compact disk (CD) or digital video disc (DVD), to input and output data and code to and from the computing system 2300 of FIG. 23. The system software for implementing embodiments described herein may be stored on such a portable medium and input to the computing system 2300 via the portable storage 2340.

One or more input devices 2360 provide a portion of a user interface. The one or more input devices 2360 may include an alphanumeric keypad, such as a keyboard, for inputting alphanumeric and other information, or a pointing device, such as a mouse, a trackball, a stylus, or cursor direction keys. Additionally, the computing system 2300 as shown in FIG. 23 includes one or more output devices 2350. Suitable one or more output devices 2350 include speakers, printers, network interfaces, and monitors.

Network interface 70 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 2370 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 2380 may include any type of computer support device to add additional functionality to the computing system. The one or more peripheral devices 2380 may include a modem or a router.

The components contained in the exemplary computing system 2300 of FIG. 23 are those typically found in computing systems that may be suitable for use with embodiments described herein and are intended to represent a broad category of such computer components that are well known in the art. Thus, the exemplary computing system 2300 of FIG. 23 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, a cascade auto-review system for automated classification and annotation of input is described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A cascade auto-review system for automated classification and annotation of input, the system comprising:
    a communication module configured to receive the input, the input including images, videos, and metadata;
    a plurality of subsystems, the plurality of subsystems operatively coupled to the communication module, each subsystem of the plurality of subsystems including a series of successive classifier stages, the successive classifier stages being stackable or removable to adapt the subsystem of the plurality of subsystems to a classification task;
    the series of successive classifier stages configured to implement a spotter algorithm to detect tags for one or more objects within one or more scenes in the input and annotate the tags based on the images, the videos, and the metadata; and
    a database operatively coupled to the plurality of subsystems, the database configured to store results of the automated classification and the annotation, the results being used to train computer vision and machine learning algorithms.

2. The cascade auto-review system of claim 1, further comprising the images including source images, the videos including source videos, and the metadata including one or more of the following: a brand identifier, a publisher identifier, a spotter identifier, and a matched logo template.

3. The cascade auto-review system of claim 1, further comprising the input being pulled from one or more social networks.

4. The cascade auto-review system of claim 1, further comprising the plurality of subsystems including a brand detection auto-review system, an asset detection auto-review system, a scene detection auto-review system, and an active-passive detection auto-review system.

5. The cascade auto-review system of claim 1, wherein when the series of successive classifier stages are unable to classify the input, the input is enqueued for human review.

6. The cascade auto-review system of claim 1, further comprising the results including one or more of the following: a brand identifier and brand coordinates, an asset identifier and asset coordinates, a scene identifier, and an active-passive identifier.

7. The cascade auto-review system of claim 1, further comprising the plurality of subsystems including layers of further classifiers, the further classifier being trained based on a task of any of a brand detection auto-review system, an asset detection auto-review system, a scene detection auto-review system, and an active-passive detection auto-review system.

8. A non-transitory processor-readable medium having instructions stored thereon which when executed by one or more processors, cause the one or more processors to implement a method for automated classification and annotation of input, the method comprising:
    receiving input by way of a communication module, the input including images, videos, and metadata;
    detecting tags in the input and annotating the tags for one or more objects within one or more scenes based on the images, the videos, and the metadata, the detection performed by a plurality of subsystems operatively coupled to the communication module, each subsystem including a series of successive classifier stages being stackable or removable to adapt the subsystem of the plurality of subsystems to a classification task, the series of successive classifier stages configured to implement a spotter algorithm to detect and annotate the tags for the one or more objects within the one or more scenes;

storing results of the automated classification and the annotation in a database; and using the results to train computer vision and machine learning algorithms.

9. The non-transitory processor-readable medium of claim 8, wherein the images include source images, the videos include source videos, and the metadata include one or more of the following: a brand identifier, a publisher identifier, a spotter identifier, and a matched logo template.

10. The non-transitory processor-readable medium of claim 8, further comprising the plurality of subsystems including a brand detection auto-review system, an asset detection auto-review system, a scene detection auto-review system, and an active-passive detection auto-review system.

11. The non-transitory processor-readable medium of claim 8, the method further comprising enqueueing the input for human review when the series of successive classifier stages are unable to classify the input.

12. The non-transitory processor-readable medium of claim 8, wherein the results include one or more of the following: a brand identifier and brand coordinates, an asset identifier and asset coordinates, a scene identifier, and an active-passive identifier.

13. The non-transitory processor-readable medium of claim 8, further comprising the plurality of subsystems including layers of further classifiers, the further classifier being trained based on a task of any of a brand detection auto-review system, an asset detection auto-review system, a scene detection auto-review system, and an active-passive detection auto-review system.

14. The method of claim 8, further comprising the input being pulled from one or more social networks.

15. A method of assembling a cascade auto-review system for automated classification and annotation of input, the method comprising:

configuring a communication module to receive the input, the input including images, videos, and metadata;

providing a plurality of subsystems, the plurality of subsystems operatively coupled to the communication module, each subsystem of the plurality of subsystems including a series of successive classifier stages being stackable or removable to adapt the subsystem of the plurality of subsystems to a classification task, and the series of successive classifier stages configured to implement a spotter algorithm to detect tags for one or more objects within one or more scenes in the input and annotate the tags based on the images, the videos, and the metadata;

providing a database, the database operatively coupled to the plurality of subsystems;

configuring the database to store results of the automated classification and the annotation; and using the results to train computer vision and machine learning algorithms.

16. The method of claim 15, further comprising the images including source images, the videos including source videos, and the metadata including one or more of the following: a brand identifier, a publisher identifier, a spotter identifier, and a matched logo template.

17. The method of claim 15, further comprising the plurality of subsystems including a brand detection auto-review system, an asset detection auto-review system, a scene detection auto-review system, and an active-passive detection auto-review system.

18. The method of claim 15, further comprising configuring the plurality of subsystems to enqueue the input for human review when the series of successive classifier stages are unable to classify the input.

19. The method of claim 15, further comprising the results including one or more of the following: a brand identifier and brand coordinates, an asset identifier and asset coordinates, a scene identifier, and an active-passive identifier.

20. The method of claim 15, further comprising the plurality of subsystems including layers of further classifiers, the further classifier being trained based on a task of any of a brand detection auto-review system, an asset detection auto-review system, a scene detection auto-review system, and an active-passive detection auto-review system.

* * * * *